Patented Nov. 28, 1950

2,531,712

UNITED STATES PATENT OFFICE 2,531,712

PREPARATION OF CRYSTALLINE SALTS OF RIBOFLAVIN

Max Tishler, Rahway, N. J., and John W. Wellman, Pittsfield, Mass., assignors to Merck & Co., Inc., Rahway, N. J., a corporation of New Jersey No Drawing. Application July 17, 1945, Serial No. 605,628

5 Claims. (Cl. 260—211.3)

This invention relates to water soluble compounds of riboflavin. This is a continuation-in-part of co-pending application Serial No. 483,782, filed by the same inventors April 20, 1943, entitled "Chemical Compounds and Process of Preparing the Same," which is a continuation-in-part of application Serial No. 320,636, filed by the same inventors on February 24, 1940, entitled "Alkali Metal Derivatives of Riboflavin and Processes for Producing the Same," both of which are now abandoned.

Due to its extreme insolubility (about 12 mgm. in 100 cc. of water at 25° C.), riboflavin cannot satisfactorily be administered by injection because to inject a therapeutic dose in aqueous solution, it is necessary to inject a large volume of liquid which is often difficult to handle conveniently and furthermore the injection is painful to the patient. Attempts have been made to find a non-toxic solvent suitable for injection in which riboflavin would be readily soluble, or to find materials which could be added to an aqueous solution to increase the solubility therein of riboflavin. However the solvents that can be used for injection purposes are few and materials which may be added to an aqueous solution to increase the solubility of riboflavin often produce undesirable effects, due either to their high concentration, or their peculiar action when injected into the animal organism.

In accordance with the present invention, an aqueous solution containing a relatively high concentration of riboflavin is provided and which is satisfactorily tolerated by animal organisms when injected. This is accomplished by forming a compound of riboflavin with an alkali or alkaline earth metal which is readily water-soluble to produce a potent but non-toxic solution.

Riboflavin, 6:7-dimethyl-9-(d-1'-ribityl-)isoalloxazine, can be represented by the formula:

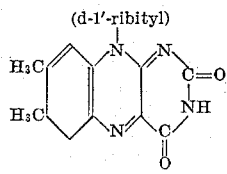

and is believed to exist in the tautomeric forms indicated by the formulae

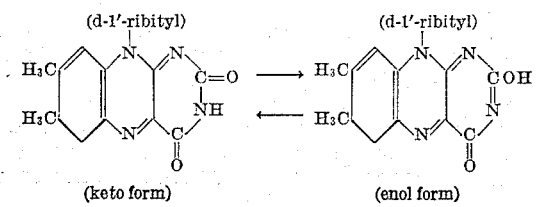

(keto form)      (enol form)

In acidic solutions the keto form predominates; in basic solution the enol form is present. Aqueous solutions of pure riboflavin are acidic (pH about 6).

Heretofore alkaline solutions of riboflavin have been prepared but were found to be extremely unstable, the riboflavin present being changed particularly when exposed to light, into lumiflavin (6:7:9-trimethyl-iso-alloxazine) with consequent loss of the desired physiological activity. No water soluble product having the physiological activity of riboflavin has heretofore been isolated from alkaline solutions of the vitamin, nor indeed has it been demonstrated that any such product exists in these solutions. For example, Green et al. [J. Am. Chem. Soc., 59, 1820–3 (Oct., 1937)], during attempts to isolate pure riboflavin by treatment of substances wherein riboflavin naturally occurs, prepared an adsorbate which was eluted with an aqueous alkaline solution. This aqueous alkaline eluate contained merely infinitesimal quantities of riboflavin together with a substantial quantity of contaminant, and experimental studies have made clear that no alkali metal salt of riboflavin can be isolated therefrom. It follows accordingly that prior to the present invention, not only were alkali metal salts of riboflavin unknown, but also the remarkable and useful properties which these new compounds are now found to possess were likewise unknown.

Contrary to the expected, it is now found by the present inventors in accordance with this invention that it is possible to prepare compounds of riboflavin with alkali and alkaline earth metals which are at least as stable as the vitamin itself, possess full physiological activity, and are readily soluble in water to produce stable solutions suitable for injection into animal organisms. The solubility of these compounds is such that a therapeutic dose is soluble in a small volume of water thus facilitating injection.

According to this invention it is found that alkaline metal salts of riboflavin can be prepared conveniently by dissolving the desired quantity of riboflavin in alkali, preferably carbonate-free alkali in aqueous solution, treating the mixture with certain water-miscible organic solvents in quantity suited to cause precipitation of the salt, which is then filtered and centrifuged. The resulting product, after washing free of alkali, is dried.

The following examples illustrate specific methods of carrying out the invention, but it is to be understood that they are presented by way of illustration and not of limitation.

*Example 1*

To about 100 cc. of 0.05 N. sodium hydroxide (carbonate free, prepared from a concentrated solution of sodium methylate) is added approximately 1 gram of riboflavin. The mixture is stirred in the absence of light until solution is effected, then filtered or centrifuged if necessary, and to the clear solution about 350 cc. of alcohol is added with stirring. The mixture is then centrifuged, and the sodium salt of riboflavin, obtained as bright yellow crystals, is washed four times with alcohol, twice with ether, and then dried in a vacuum desiccator. The crystals are readily soluble in water to give a solution containing approximately 5% riboflavin. When tested biologically the sodium salt shows the same activity as riboflavin in growth response in rats.

When caesium or rubidium hydroxides are substituted for the sodium hydroxide used in the above example, the products are the caesium or rubidium salts respectively of riboflavin.

*Example 2*

About 12.0 g. of riboflavin are suspended in approximately 800 cc. of distilled water and a filtered solution of about 4.0 g. of potassium hydroxide in 50 cc. of methanol is added. After about five minutes, the solution is filtered to remove solid material and the potassium salt is precipitated by the addition of about 4 l. of alcohol. The precipitate is filtered, washed with alcohol, then ether and dried at 50° under vacuum. The product, the crude potassium salt of riboflavin, is obtained as a red-yellow powder. The product can be purified by dissolving it in about 400 cc. of water at 25° to 30°, filtering and precipitating the salt by addition of about 1.2 l. of alcohol. The purified product is then dried at 100° under vacuum. When purified, the potassium salt is a brilliantly orange-yellow powder moderately soluble in water.

*Example 3*

About 5 g. of calcium metal are added to 250 cc. of absolute ethanol under an atmosphere of nitrogen. The calcium alcoholate solution is filtered and titrated to determine its strength and is found to contain about 0.0008 moles of Ca/cc.

Approximately 12 g. of riboflavin are suspended in 800 cc. of water and about 50 cc. of the above calcium alcoholate solution are added. After stirring for one hour the precipitate is filtered, washed with ethanol, then ether, and dried at 100° under vacuum. The product, the calcium salt of riboflavin, is obtained as orange-brown crystals, slightly soluble in water.

When lithium, strontium or barium alcoholates are substituted for the calcium alcoholate in the foregoing reactions, the products obtained are respectively, the lithium, strontium or barium salts of riboflavin.

*Example 4*

About 7.5 gms. of riboflavin are suspended in approximately 300 cc. of methanol and about 50 cc. of methanol in which approximately 0.5 gm. of sodium metal has been dissolved are added. The mixture is refluxed for approximately two hours and, upon cooling, the desired product, the sodium salt of riboflavin, precipitates from the solution and is removed by conventional operations. The product thus obtained, which can be purified by washing free of alkali methanol, is a mass of brilliant yellow crystals easily soluble in water.

In like manner the potassium salt of riboflavin and the calcium salt of riboflavin can be prepared by substituting potassium methylate solution or calcium methylate solution for the sodium methylate solution employed in the above process.

The foregoing reactions can be conducted in any of a wide variety of organic solvents. The essential limitations controlling selection of such solvents being that the selected solvent is water-miscible and essentially neutral. Solvents which are satisfactory include simple lower dialkyl ketones such as acetone, methyl ethyl ketone, and the like, lower alkyl esters of aliphatic acids, such as methyl acetate, methyl propionate, ethyl formate, ethyl acetate, ethyl lactate, and the like, lower aliphatic alcohols, and equivalent organic solvents.

By the expression "salt of riboflavin" as herein used will be understood compounds capable of being represented by the general formula:

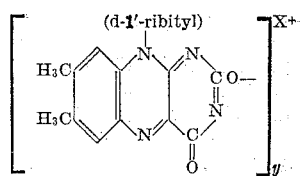

wherein X is an alkali metal ion or alkaline earth metal ion, and $y$ is the valence number of X.

Modifications may be made in carrying out the present invention without departing from the spirit and scope thereof and the invention is to be limited only by the appended claims.

What is claimed is:

1. A process for preparing a compound selected from the group consisting of the alkali metal salts of riboflavin and the alkaline earth metal salts of riboflavin that comprises the following steps: (1) treating riboflavin with a substantially anhydrous lower aliphatic alcohol solution of a compound selected from the class consisting of alkali metal alcoholates and alkaline earth metal alcoholates to form a salt of riboflavin; and (2) crystallizing and separating the riboflavin salt.

2. A process for preparing a compound selected from the group consisting of the alkali metal salts of riboflavin and the alkaline earth metal salts of riboflavin that comprises the following steps: (1) treating riboflavin with a substantially anhydrous methanol solution of a compound selected from the class consisting of alkali metal methylates and alkaline earth metal methylates to form a salt of riboflavin; and (2) crystallizing and separating the riboflavin salt.

3. A process for preparing the sodium salt of riboflavin that comprises the following steps: (1) treating riboflavin with a substantially anhydrous methanol solution of sodium methylate to form the sodium salt of riboflavin; and (2) crystallizing and separating the riboflavin salt.

4. A process for preparing the calcium salt of riboflavin that comprises the following steps: (1) treating riboflavin with a substantially anhydrous methanol solution of calcium methylate to form the calcium salt of riboflavin; and (2) crystallizing and separating the riboflavin salt.

5. The process of preparing crystalline alkali metal and alkaline earth metal salts of riboflavin which comprises reacting riboflavin with a compound selected from the class which consists of alkali metal alcoholates and alkaline earth metal alcoholates, said reaction being carried out in a medium comprising a substantially anhydrous lower aliphatic alcohol, to form a salt of riboflavin, and crystallizing said riboflavin salt.

MAX TISHLER.
JOHN W. WELLMAN.

REFERENCES CITED

The following references are of record in the file of this patent:

UNITED STATES PATENTS

| Number | Name | Date |
|---|---|---|
| 2,332,548 | Auerbach | Oct. 26, 1943 |

OTHER REFERENCES

Greene et al.: Journal American Chem. Soc., Oct. 1937, vol. 59.

Kuhling: "Ber. Deut. Chem.," vol. 24 (1891), pages 2364–2366, 3 pages.

Mohlau et al.: "J. Prak. Chem.," vol 181 (1906), pages 481–482, 2 pages.

Kuhn et al.: "Ber. Deut. Chem.," vol. 68 (1935), pages 169–170, 2 pages.